US010005877B2

(12) United States Patent
Harasin et al.

(10) Patent No.: US 10,005,877 B2
(45) Date of Patent: *Jun. 26, 2018

(54) POLYURETHANE PULTRUSION FORMULATIONS FOR THE PRODUCTION OF ARTICLES WITH IMPROVED COATING ADHESION AND ARTICLES PRODUCED THEREFROM

(71) Applicant: Covestro LLC, Pittsburgh, PA (US)

(72) Inventors: Stephen J. Harasin, Morgan, PA (US); John E. Hayes, Gibsonia, PA (US); David Sounik, Bethel Park, PA (US)

(73) Assignee: COVESTRO LLC, Pittsburgh, PA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 14/893,350

(22) PCT Filed: Jun. 18, 2014

(86) PCT No.: PCT/US2014/042862
§ 371 (c)(1),
(2) Date: Nov. 23, 2015

(87) PCT Pub. No.: WO2014/209704
PCT Pub. Date: Dec. 31, 2014

(65) Prior Publication Data
US 2016/0108168 A1    Apr. 21, 2016

Related U.S. Application Data

(60) Provisional application No. 61/838,924, filed on Jun. 25, 2013.

(51) Int. Cl.
| *C08G 18/76*  | (2006.01) |
| *C08G 18/48*  | (2006.01) |
| *C08K 7/14*   | (2006.01) |
| *B29C 70/52*  | (2006.01) |
| *C09D 175/08* | (2006.01) |
| *B29K 75/00*  | (2006.01) |

(52) U.S. Cl.
CPC ........ *C08G 18/7671* (2013.01); *B29C 70/521* (2013.01); *C08G 18/4816* (2013.01); *C08G 18/4829* (2013.01); *C08G 18/4891* (2013.01); *C08G 18/7664* (2013.01); *C08K 7/14* (2013.01); *C09D 175/08* (2013.01); *B29K 2075/00* (2013.01)

(58) Field of Classification Search
CPC .............. B29C 70/521; B29K 2075/00; C08G 18/4816; C08G 18/4829; C08G 18/4891; C08G 18/7664; C08G 18/7671; C08K 7/14; C09D 175/08

USPC ................. 428/423.1; 524/44, 74.5
See application file for complete search history.

(56) References Cited

U.S. PATENT DOCUMENTS

| 4,876,050 | A | 10/1989 | Horton |
| 5,087,193 | A | 2/1992 | Herbert, Jr. |
| 5,332,606 | A | 7/1994 | Pearce |
| 5,470,813 | A * | 11/1995 | Le-Khac ............... B01J 27/26 |
| | | | 502/175 |
| 5,766,357 | A | 6/1998 | Packer et al. |
| 6,179,945 | B1 | 1/2001 | Greenwood et al. |
| 6,420,493 | B1 | 7/2002 | Ryckis-Kite et al. |
| 6,593,255 | B1 | 7/2003 | Lawton et al. |
| 6,768,029 | B1 * | 7/2004 | Khan ..................... C07C 45/40 |
| | | | 568/469 |
| 6,793,855 | B2 | 9/2004 | Cheolas et al. |
| 7,014,803 | B2 | 3/2006 | Perez et al. |
| 7,056,976 | B2 | 6/2006 | Joshi et al. |
| 7,202,302 | B2 | 4/2007 | Cheolas et al. |
| 7,244,772 | B2 * | 7/2007 | Ittara ..................... C08G 18/36 |
| | | | 521/170 |
| 7,393,465 | B2 * | 7/2008 | Niesten ................ C08G 18/283 |
| | | | 252/182.25 |
| 7,413,623 | B2 | 8/2008 | Raday |
| 7,507,361 | B2 | 3/2009 | Joshi et al. |
| 7,828,991 | B2 * | 11/2010 | Reese ................ C08G 18/4072 |
| | | | 252/182.25 |
| 8,541,500 | B2 | 9/2013 | Suau et al. |
| 9,757,905 | B2 * | 9/2017 | Harasin ................. B29C 70/30 |
| 2004/0106726 | A1 * | 6/2004 | Joshi ................. C08G 18/0885 |
| | | | 524/589 |
| 2005/0236730 | A1 | 10/2005 | Joshi et al. |

(Continued)

FOREIGN PATENT DOCUMENTS

| CN | 102660014 A | 9/2012 |
| WO | 2007062516 A1 | 6/2007 |
| WO | 2015077944 A1 | 6/2015 |

OTHER PUBLICATIONS

Ionescu, et al., "Polyols and rigid polyurethane foams from cashew nut shell liquid," Journal of Polymers and the Environment, 2012, 20(3): 647-658 (abstract).
Kohler et al., "An Apparatus for Determining Both the Quality of Gas Evolved and the Amount of Reagent Consumed in Reactions with Methyl Magnesium Iodide," Journal of the American Chemical Society, 1927, 49(12): 3181-3188 (abstract).
Huntsman; JEFFOL® Polyether Polyols Product Line 2010;.

*Primary Examiner* — Thao T Tran
(74) *Attorney, Agent, or Firm* — Donald R. Palladino

(57) ABSTRACT

Polyurethane composites to which paint will adhere without the need for an aggressive pretreatment are produced by a pultrusion process using a polyurethane-forming system that includes a polyisocyanate component containing at least one polyisocyanate and an isocyanate-reactive component containing at least one cashew oil-based polyether polyol.

17 Claims, No Drawings

(56) References Cited

U.S. PATENT DOCUMENTS

| | | | |
|---|---|---|---|
| 2006/0173128 A1* | 8/2006 | Connolly | B29C 70/521 |
| | | | 524/589 |
| 2006/0177591 A1 | 8/2006 | Raday | |
| 2007/0125487 A1 | 6/2007 | Elliott | |
| 2008/0090966 A1* | 4/2008 | Hayes | C08G 18/4812 |
| | | | 525/123 |
| 2008/0139685 A1 | 6/2008 | Reese et al. | |
| 2008/0160286 A1 | 7/2008 | Asrar et al. | |
| 2008/0274319 A1 | 11/2008 | Berksoy et al. | |
| 2009/0019816 A1 | 1/2009 | Lockwood et al. | |
| 2009/0023870 A1 | 1/2009 | Berksoy et al. | |
| 2010/0160469 A1 | 6/2010 | Adkins et al. | |
| 2016/0257813 A1* | 9/2016 | Li | C08G 18/1833 |

* cited by examiner

POLYURETHANE PULTRUSION FORMULATIONS FOR THE PRODUCTION OF ARTICLES WITH IMPROVED COATING ADHESION AND ARTICLES PRODUCED THEREFROM

FIELD OF THE INVENTION

The present invention relates in general to, pultrusion and more specifically to, polyurethane formulations for use in pultrusion processes that produce articles to which paint, coatings and protective layers adhere better than known pultruded articles and the articles produced from these formulations by a pultrusion process.

BACKGROUND OF THE INVENTION

Pultrusion is a manufacturing process for producing continuous lengths of fiber reinforced plastic ("FRP") structural shapes. Raw materials include a liquid resin mixture (containing resin, fillers and specialized additives) and reinforcing fibers. The process involves pulling these raw materials, rather than pushing as is the case in extrusion, through a heated steel forming die using a continuous pulling device. The reinforcement materials are in continuous forms such as rolls of fiberglass mat or doffs of fiberglass roving. The two ways to impregnate, or "wet out", the glass are the Open bath process and resin injection. Commercial resins which have typically been used in pultrusion processes include polyester, vinyl esters, phenolics, and epoxy compounds. These resins usually have very long gel times and can be run in an open bath process in which the reinforcing fibers are soaked in a bath of resin and the excess resin is scraped off by a series of pre-form plates and at the die entrance. As the wetted fibers enter the die, the excess resin is squeezed through and off the reinforcing fibers. The pressure rise in the die inlet helps to enhance fiber wet-out and to suppress void formation. As the saturated reinforcements are pulled through the die, the gelation (or hardening) of the resin is initiated by the heat from the die and a rigid, cured profile that corresponds to the shape of the die is formed.

For resin systems like polyurethanes, which have fast gel times and short pot lives the resin injection process is generally used. In the injection process, the reinforcement materials are passed through a small closed box which is usually attached to the die or may be part of the die. The resin is injected under pressure through ports in the box to impregnate the reinforcement materials. Resin injection boxes are designed to minimize resin volume and resin residence time inside the box. There are a number of different resin injection box designs in the literature all of which have the common features of an angled or tapered design and an exit profile matching the shape of the die entrance.

With respect to polyurethane pultrusion, U.S. Pat. No. 6,420,493, issued to Ryckis-Kite et al., discloses a two component chemically thermoset resin for use in composite manufacturing processes. The polyisocyanate component and the polyol component are used in amounts such that the OH/NCO equivalent ratio is from 1:1 to 1:2. U.S. Pat. No. 6,420,493 requires 10%-40% of a polyester polyol. Use of from 5 to 20 wt % of a hydroxyl terminated vegetable oil is also disclosed. In the isocyanate component, it is preferred that at least 15 wt % be an aliphatic polyisocyanate.

Cheolas et al., in U.S. Pat. No. 6,793,855, teaches polyisocyanurate systems, pultrusion of those systems to produce reinforced polyisocyanurate matrix composites and the composites produced by that pultrusion process. The polyisocyanurate systems of Cheolas et al. include a polyol component, an optional chain extender, and an isocyanate. The polyisocyanurate systems are said to have extended initiation times of from about 5 minutes to about 30 minutes at room temperature and to be capable of snap curing. Cheolas et al. also teaches that substantial polymerization of the polyurethane takes place in the impregnation die.

U.S. Pat. No. 7,056,976 (Joshi et al.) also discloses polyisocyanate-based reaction systems, a pultrusion process using those systems to produce reinforced matrix composites and composites produced by that pultrusion process. The polyisocyanate-based systems are mixed activated reaction systems that include a polyol composition, an optional chain extender or crosslinker and a polyisocyanate. These polyisocyanate-based systems are said to exhibit improved processing characteristics in the manufacture of fiber reinforced thermoset composites via reactive pultrusion. Joshi et al. teaches that gel time is the key parameter in polyurethane pultrusion processes.

Pultrusion has been used to produce exterior windows, doors and other materials used in construction that require good surface quality and weather resistance. One difficulty that has been encountered with the known polyurethane pultrusion systems has been inadequate adhesion of paint, coatings, and other protective layers to polyurethane composites produced by a pultrusion process.

A market that is particularly suited for the use of composites made by polyurethane pultrusion is the commercial window market because the physical properties of polyurethanes are comparable to those of aluminum while also providing a better insulation value than aluminum. Polyurethane composite materials can match the strength of aluminum in large commercial window applications. However, in order to be used in such applications, it is necessary to satisfy the specifications for surface coatings on parts that have been set by the American Architectural Manufacturers Association (AAMA). These AAMA requirements can be satisfied by applying either powder or wet coatings to aluminum. However, powder coatings are beyond the glass transition temperature of polyurethanes so coating a polyurethane composite with a powder coating it is not an option for meeting the requirements of the AAMA standards.

To date, surface coatings which meet AAMA requirements that can be applied to a polyurethane composite require the polyurethane composite to be aggressively pretreated. This pretreatment typically has been a flame treatment and or a plasma treatment. Both procedures add cost and require additional work to ensure that the polyurethane composite will satisfy the AAMA specifications.

It would therefore be advantageous to develop a polyurethane formulation that could be used in a pultrusion process to produce a polyurethane composite to which a coating or protective layer could be readily applied without the need for extensive pretreatment by procedures such as flame or plasma treatment.

The solution to this problem of coating a polyurethane composite made by a pultrusion process is complicated by the fact that the commercial systems used to produce polyurethane composites by a pultrusion process must include an internal release agent so that the part being formed in the pultrusion process can be pulled through the pultrusion die without sticking to the die. It is this use of such internal release agents that is believed to necessitate the extensive pretreatment of a composite article in order to achieve adequate adhesion of a coating or protective layer.

Therefore, a need exists in the art for polyurethane formulations suitable for use in pultrusion processes to produce polyurethane reinforced composites to which paints, coatings and protective layers can adhere without the need for extensive pre-treatment.

SUMMARY OF THE INVENTION

The present invention provides a reaction system for the preparation of a fiber reinforced composite by a pultrusion process made from continuous fiber reinforcing material and a polyurethane formulation containing a polyisocyanate component including at least one polyisocyanate and an isocyanate-reactive component including at least one cashew oil-based polyol. Also provided is an improved process for applying a coating or protective layer to a polyurethane-reinforced composite made by a pultrusion process which composite has been produced using the polyurethane formulations of the present invention.

These and other advantages and benefits of the present invention will be apparent from the Detailed Description of the Invention below.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Equivalent weights and molecular weights given herein in Daltons (Da) are number average equivalent weights and number average molecular weights respectively, unless indicated otherwise.

As used herein, the term "cashew oil-based polyether polyol" means a polyether polyol that has been produced from the shell of a cashew nut.

As used herein, the term "excellent adhesion" means that a coated composite achieves a rating of at least 4B or 95% retention when measured by normal cross hatch adhesion testing in accordance with ASTM 3359 or that the coated composite meets the requirements of AAMA 625 for coating adhesion on window applications when tested both under dry and wet conditions.

As used herein, the expression "minimal pretreatment" means that the composite surface requires no more than cleaning of the surface with, for example, alcohol prior to application of a coating to the surface of the composite.

The present invention provides a reaction system for the preparation of a fiber reinforced composite by a pultrusion process made from continuous fiber reinforcing material and a polyurethane formulation containing a polyisocyanate component including at least one polyisocyanate and an isocyanate-reactive component including at least one cashew oil-based polyol.

The present invention further provides a process for preparing a fiber reinforced polyurethane composite to which paint, a coating or a protective layer can be readily applied without the need for an aggressive pretreatment such as flame or plasma treatment.

In the process of the present invention, a roving or tow of continuous fiber reinforcing material is continuously and successively pulled through an impregnation chamber and a die. A polyurethane-forming formulation made from a polyisocyanate component containing at least one polyisocyanate and an isocyanate-reactive component containing at least one cashew oil-based polyol is continuously fed to the impregnation chamber. The fiber reinforcing material is contacted with the polyurethane-forming formulation in the impregnation chamber in a manner such that substantially complete wetting of the material by the polyurethane-forming formulation occurs. The fiber reinforcing material is directed through a die heated to reaction temperature to form a solid composite and the composite is drawn from the die.

The present invention further provides a process for coating a fiber reinforced polyurethane composite without the need for an aggressive pretreatment such as flame or plasma treatment. In this process of the present invention, the surface of the polyurethane reinforced composite produced by pultruding a roving or tow of continuous fiber reinforcing material and a polyurethane-forming formulation made from a polyisocyanate component containing at least one polyisocyanate and an isocyanate-reactive component containing at least one cashew oil-based polyol composite is then simply wiped with alcohol to remove dust and or fingerprints and a coating material is then applied.

It has been found that the inclusion of a cashew oil-based polyol in the polyol component in polyurethane-forming pultrusion formulations has unexpected benefits. Any of the known cashew oil-based polyether polyols may be used in the practice of the present invention. It is preferred, however, that the cashew oil-based polyether polyol have a viscosity of less than 9000 cps, preferably, from 500 to 4000 cps, most preferably, from 500 to 2000 cps to facilitate its use in a pultrusion process. The cashew oil-based polyether polyols employed in the practice of the present invention will generally have an OH number of from 175 to 550, preferably, from 175 to 340, most preferably, from 175 to 190 and a functionality of from 2 to 5, preferably, from 3 to 5, most preferably, from 4 to 5. This cashew oil-based polyether polyol may constitute up to 30% by weight of the isocyanate-reactive component of the polyurethane-forming system of the present invention, but will generally be included in the isocyanate-reactive component in an amount of at least 20%, preferably, in an amount of from 20 to 30%. Examples of suitable commercially available cashew oil-based polyether polyols include: Polycard XFN-50, XFN 100, XFN 150 M manufactured by Composites Technical Services of Kettering, Ohio.

The isocyanate-reactive component of the polyurethane-forming system of the present invention may optionally include one or more organic polyols in addition to the cashew oil-based polyether polyol. These optional polyols preferably differ principally in regard to hydroxyl group functionality and molecular weight. These optional organic polyols used in the isocyanate-reactive component are chosen from softblock polyols, rigid polyols, polymer polyols, chain extenders, crosslinkers, and combinations of these different types of polyols.

Polyols, which furnish softblock segments, are known to those skilled in the art as "softblock" polyols, or as flexible polyols. Such polyols preferably have a number average molecular weight of at least 1,500 Da, more preferably from 1,750 to 8,000, a number average equivalent weight of preferably from 400 to 4,000, more preferably from 750 to 2,500, and number average functionality of isocyanate reactive organic —OH groups of preferably from 1.8 to 10 and more preferably from 2 to 4. Such compounds include, for example, aliphatic polyether or aliphatic polyester polyols having primary and/or secondary hydroxyl groups. In the practice of the present invention, it is preferred that such softblock polyols make up from 0 to 40% by weight and more preferably from 10 to 30% by weight of the isocyanate-reactive component. Preferred softblock polyols are liquids at 25° C.

A preferred class of polyols that provides structural rigidity in the derived polymer is referred to in the art as rigid polyols. Such polyols preferably have number average molecular weights of from 250 to 3,000, more preferably from 250 to less than 1,500; number average equivalent weights of preferably from 80 to 750, more preferably from 85 to 300; and number average isocyanate reactive group functionalities of preferably from 2 to 10, more preferably 2 to 4, and most preferably 2 to 3. Such compounds include, for example, polyether or polyester polyols having primary and/or secondary hydroxyl groups. Preferred rigid polyols are also liquids at 25° C.

Polymer polyols ("PMPO"s) are stable dispersions of polymer particles in a polyol and thus are not prone to settling or floating. The polymer particles are chemically grafted to the polyol and act as a better reinforcing filler so that the composition of the polymer may be adjusted to give desired properties. Polymer polyols have a very low moisture content and thus avoid the problems of "wet" fillers. The polymers in polymer polyols generally have a low density in comparison to common pultrusion fillers such as clays or calcium carbonate. This means that on an equivalent weight percentage, the polymer polyols provide a higher volume fraction. Thus, lower levels of polymer polyols are required to effect a change in properties because polymer polyols can replace the typically more dense resin materials that make up the matrix. In some embodiments of the present invention it may even be desirable to add a conventional filler along with the polymer polyol(s) because the polymer polyol(s) may help keep the fillers in suspension.

Examples of polymer polyols which may be useful in the practice of the present invention include those based on styrene acrylonitrile ("SAN") copolymers, PHD polyols formed by condensation of amines and isocyanates, and PIPA polyols formed by condensation of alcohol amines with isocyanates. Dispersions based on other monomers may also be used in the practice of the present invention. Such dispersions make it possible to tailor the polymer to act as a low profile additive or fire retardant, etc. by adjusting the composition of the polymer. Dispersions of solids in the polyisocyanate component may also be used.

Polyol chain extenders and crosslinkers that may be included in the isocyanate-reactive component of the formulations of the present invention will typically have molecular weights from 60 to less than 250, preferably from 60 to 150, and isocyanate-reactive group functionalities of from 2 to 4, preferably from 2 to 3.

Examples of suitable chain-extenders/crosslinkers are simple glycols and triols, such as ethylene glycol, propylene glycol, dipropylene glycol, 1,4-butanediol, 1,3-butanediol, triethanolamine, triisopropanolamine, tripropylene glycol, diethylene glycol, triethylene glycol, glycerol, and mixtures thereof. The most preferred chain-extenders/crosslinkers are liquids at 25° C. Although aliphatic-OH functional compounds, such as those just listed, are the most preferred chain-extenders/crosslinkers, it is also within the scope of the present invention to employ certain polyamines, polyamine derivatives, and/or polyphenols. Examples of suitable amines known in the art include diisopropanolamine, diethanolamine, and 3,5-diethyl-2,4-diaminotoluene, 3,5-diethyl-2,6-diaminotoluene, and mixtures thereof. Examples of suitable isocyanate reactive amine derivatives include certain imino-functional compounds such as those described in EP 0 284 253 and EP 0 359 456 and certain enamino-functional compounds such as those described in EP 0 359 456 having 2 or more isocyanate-reactive groups per molecule. Reactive amines, especially aliphatic primary amines, are less preferred due to their extremely high reactivity with polyisocyanates, but may optionally be used, if desired, in minor amounts.

It is also within the scope of the present invention, albeit less preferred, to include within the isocyanate-reactive component minor amounts of other types of isocyanate reactive species that may not conform to the types described hereinabove.

In one embodiment, a preferred isocyanate-reactive component contains a mixture of optional polyols and cashew oil-based polyether polyol wherein the hydroxyl number of the mixture is preferably between 400 and 420, more preferably between 400 and 410, and most preferably between 400 and 405.

Some preferred types of optional polyols include polyether polyols and polyester polyols. Suitable polyether polyols that can be employed in the reaction systems of the invention include those that are prepared by reacting an alkylene oxide, a halogen substituted or aromatic substituted alkylene oxide or mixtures thereof, with an active hydrogen containing initiator compound.

Suitable polyisocyanates are known to those skilled in the art and include unmodified isocyanates, modified polyisocyanates, and isocyanate prepolymers. Such organic polyisocyanates include aliphatic, cycloaliphatic, araliphatic, aromatic, and heterocyclic polyisocyanates of the type described, for example, by W. Siefken in Justus Liebigs Annalen der Chemie, 562, pages 75 to 136. Examples of such isocyanates include those represented by the formula,

Q(NCO)n in which n is a number from 2-5, preferably 2-3, and Q is an aliphatic hydrocarbon group containing 2-18, preferably 6-10, carbon atoms; a cycloaliphatic hydrocarbon group containing 4-15, preferably 5-10, carbon atoms; an araliphatic hydrocarbon group containing 8-15, preferably 8-13, carbon atoms; or an aromatic hydrocarbon group containing 6-15, preferably 6-13, carbon atoms.

Examples of suitable isocyanates include: ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane (isophorone diisocyanate); 2,4- and 2,6-hexahydrotoluene diisocyanate and mixtures of these isomers; dicyclohexylmethane-4,4'-diisocyanate (hydrogenated MDI, or HMDI); 1,3- and 1,4-phenylene diisocyanate; 2,4- and 2,6-toluene diisocyanate and mixtures of these isomers (TDI); diphenylmethane-2,4'- and/or -4,4'-diisocyanate (MDI); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (crude MDI); norbornane diisocyanates; m- and p-isocyanatophenyl sulfonylisocyanates; perchlorinated aryl polyisocyanates; modified polyisocyanates containing carbodiimide groups; modified polyisocyanates containing urethane groups; modified polyisocyanates containing allophanate groups; modified polyisocyanates containing isocyanurate groups; modified polyisocyanates containing urea groups; polyisocyanates containing biuret groups; polyisocyanates obtained by telomerization reactions; polyisocyanates containing ester groups; reaction products of the above-mentioned isocyanates with acetals; and polyisocyanates containing polymeric fatty acid groups. It is also possible to use the isocyanate-containing distillation residues accumulating in the production of isocyanates on a commercial scale, optionally in solution in one or more of the polyisocyanates mentioned above. Those skilled in the art will recognize that it is also possible to use mixtures of the polyisocyanates described above.

Isocyanate-terminated prepolymers may also be employed in the present invention. Prepolymers may be prepared by reacting an excess of organic polyisocyanate or mixtures thereof with a minor amount of an active hydrogen-containing compound as determined by the well-known Zerewitinoff test, as described by Kohler in "Journal of the American Chemical Society," 49, 3181(1927). These compounds and their methods of preparation are well known to those skilled in the art. The use of any one specific active hydrogen compound is not critical; any such compound can be employed in the practice of the present invention.

The polyisocyanate component preferably contains organic polyisocyanates having a number average isocyanate (NCO) functionality of from at least 1.8 to 4.0, more preferably from 2.0 to 3.0, most preferably from 2.3 to 2.9. The NCO functionality of the polyisocyanate component may be a number ranging between any combination of these values, inclusive of the recited values. The polyisocyanate component preferably has a free isocyanate group content (NCO content) in the range of from 5% to 50% by weight, more preferably from 8% to 40%, most preferably from 9% to 35% by weight. The free NCO group content of the polyisocyanate component may be an amount ranging between any combination of these values, inclusive of the recited values.

The reaction mixture may optionally contain a catalyst for one or more of the polymer forming reactions of polyisocyanates. Catalyst(s), where used, is/are preferably introduced into the reaction mixture by pre-mixing with the isocyanate-reactive component. Catalysts for the polymer forming reactions of organic polyisocyanates are well known to those skilled in the art. Preferred catalysts include, but are not limited to, tertiary amines, tertiary amine acid salts, organic metal salts, covalently bound organometallic compounds, and combinations thereof. The catalyst level required to achieve the needed reactivity profile for pultrusion processing will vary with the composition of the formulation and must be optimized for each reaction system (formulation). Such optimization is well within the skill of a person of ordinary skill in the art. The catalysts preferably have at least some degree of solubility in the isocyanate-reactive component used, and are most preferably fully soluble in that component at the required use levels.

The formulations of the present invention may contain other optional additives, if desired. Examples of additional optional additives include particulate or short fiber fillers, internal mold release agents, fire retardants, smoke suppressants, dyes, pigments, antistatic agents, antioxidants, UV stabilizers, minor amounts of viscosity reducing inert diluents, combinations of these, and any other known additives from the art. In some embodiments of the present invention, the additives or portions thereof may be provided to the fibers, such as by coating the fibers with the additive.

Internal mold release additives are preferably used in the pultrusion of isocyanate-based resins systems to prevent sticking or buildup in the die. Suitable internal mold release agents include, for example, fatty amides such as erucamide or stearamide; fatty acids such as oleic acid; oleic acid amides; fatty esters such as LOXIOL G71S, an inert polyester available from Henkel; carnuba wax; beeswax (natural esters); butyl stearate; octyl stearate; ethylene glycol monostearate; ethylene glycol distearate; glycerin di-oleate; glycerin tri-oleate; esters of polycarboxylic acids with long chain aliphatic monovalent alcohols such as dioctyl sebacate; mixed esters of aliphatic polyols, dicarboxylic acids and long-chained aliphatic monocarboxylic acids; esters of dicarboxylic acids and long-chained aliphatic monofunctional alcohols; esters of long-chained aliphatic monofunctional alcohols and long-chained aliphatic monofunctional carboxylic acids; complete or partial esters of aliphatic polyols and long-chained aliphatic monocarboxylic acids; silicones such as TEGO IMR 412T silicone (from Goldschmidt); KEMESTER 5721 ester (a fatty acid ester product from Witco Corporation); fatty acid metal carboxylates such as zinc stearate and calcium stearate; waxes such as montan wax and chlorinated waxes; fluorine containing compounds such as polytetrafluoroethylene; fatty alkyl phosphates (both acidic and non acidic types such as ZELEC UN, ZELEC AN, ZELEC MR, ZELEC VM-, ZELEC UN, ZELECLA-1, and ZELEC LA-2 phosphates, which are all commercially available from Stepan Chemical Company); chlorinated-alkyl phosphates; hydrocarbon oils; and combinations of these materials. Especially preferred internal mold release agents are those sold under the names TECHLUBE 550HB (available from Technick Products) and 1948MCH (available from Axel Plastics).

Other preferred optional additives for use in the pultrusion process of the present invention include: moisture scavengers, such as molecular sieves; defoamers, such as polydimethylsiloxanes; coupling agents, such as the mono-oxirane or organo-amine functional trialkoxysilanes; and combinations thereof. Coupling agents are particularly preferred for improving the bonding of the matrix resin to the fiber reinforcement. Fine particulate fillers, such as clays and fine silicas, are often used as thixotropic additives. Such particulate fillers may also serve as extenders to reduce the amount of resin used. Fire retardants are sometimes desirable as additives in pultruded composites. Examples of preferred fire retardants include, but are not limited to, triaryl phosphates; trialkyl phosphates, especially those bearing halogens; melamine (as filler); melamine resins (in minor amounts); halogenated paraffins and combinations thereof.

The stoichiometry of mixing isocyanate-based polymer forming formulations, containing an organic polyisocyanate and a polyfunctional isocyanate reactive resin is often expressed by a quantity known in the art as the isocyanate index. The index of such a formulation is simply the ratio of the total number of reactive isocyanate (—NCO) groups present to the total number of isocyanate-reactive groups (that can react with the isocyanate under the conditions employed in the process). This quantity is often multiplied by 100 and expressed as a percent. Preferred isocyanate index values in the mixing activated formulations, which are suitable for use in the practice of the present invention range from 70 to 150%. A more preferred range of index values is from 90 to 125%.

As those skilled in the art are aware, pultrusion of polyurethane and polyisocyanurate systems with fiber reinforced composites is performed by supplying the isocyanate and polyol components to a mix/metering machine for delivery in a desired ratio to a mixing apparatus, preferably a static mixer, to produce a reaction mixture. The reaction mixture is supplied to an injection die where it can be used to impregnate fibers being pulled concurrently into the injection die. The resulting uncured composite is pulled through a zoned heating die, attached directly to the injection die, having a desired cross-section where it is shaped and cured. The curing die has two to three heated zones equipped with electrical heating coils individually controlled to maintain the desired temperatures. The entrance to the die is cooled to prevent premature polymerization. The temperature of the hottest zone generally ranges from about 350° F. to about 450° F. The dynamic forces needed to pull the composite through the forming die are supplied by the pulling machine. This machine typically has gripping devices that contact the cured composite profile (or the glass fibers therein) and give the traction necessary to pull the composite profile through the die. The machine also has a device that develops a force in the desired direction of pull that gives the impetus necessary to pull the composite profile continuously through the die. The resulting composite profile upon exiting the pulling machine is then cut to the desired length typically by an abrasive cut off saw.

The formulations of the present invention are particularly advantageous because they produce pultruded parts having a surface which may be painted after simply being wiped with alcohol. The painted surface of composites produced in accordance with the present invention exhibit excellent paint adhesion and scratch resistance as well as decreased density and weight.

Contrary to teachings in the art that a high degree of polymerization must occur within the impregnation die, it has been found more desirable to have essentially no reaction occur inside of the impregnation die. Although the gel time of all resins, not just polyurethanes, is important, it is not the key factor in determining pultrusion processability.

A long fiber based reinforcing material is necessary to provide mechanical strength to the pultruded composite, and to allow the transmission of the pulling force in the process. Fibers should preferably be at least long enough to pass though both the impregnation and curing dies and to be attached to a source of tension. In the present invention, the fibrous reinforcing material may be made of any fibrous material or materials that can provide long fibers capable of being at least partially wetted by the polyurethane formulation during impregnation. The fibrous reinforcing material may be single strands, braided strands, woven or non-woven mat structures and combinations thereof. Mats or veils made of long fibers may be used, in single ply or multi-ply structures. Suitable fibrous materials are known to those skilled in the pultrusion art. Examples of suitable fibrous materials include, but are not limited to, glass fibers, glass mats, carbon fibers, polyester fibers, natural fibers, aramid fibers, nylon fibers, basalt fibers, and combinations thereof. Particularly preferred in the present invention are long glass fibers. The fibers and/or fibrous reinforcing structures may be formed continuously from one or more reels feeding into the pultrusion apparatus and attached to a source of pulling force at the outlet side of the curing die. The reinforcing fibers may optionally be pre-treated with sizing agents or adhesion promoters known to those skilled in the art.

The weight percentage of the long fiber reinforcement in the pultruded composites of the present invention may vary considerably, depending on the end use application intended for the composite articles. Reinforcement loadings may be from 30 to 95% by weight, preferably from 40 to 90% by weight, more preferably from 60 to 90% by weight, and most preferably from 70 to 90% by weight, based on the weight of the final composite. The long fiber reinforcement may be present in the pultruded composites of the present invention in an amount ranging between any combination of these values, inclusive of the recited values.

In some embodiments of the present invention, the polyisocyanate component and the isocyanate-reactive component may be the only components that are fed into the impregnation die in the pultrusion process. The polyisocyanate component or the isocyanate-reactive component may be premixed with any optional additives. However, it is to be understood that the optional additives that are not themselves polyfunctional isocyanate-reactive materials are to be considered (counted) as entities separate from the isocyanate-reactive component, even when mixed therewith. Likewise, if the optional additives, or any part thereof, are premixed with the polyisocyanate component, these are to be considered as entities separate from the polyisocyanate component, except in the case where they are themselves polyfunctional isocyanate species.

The impregnation die preferably provides for adequate mixing of the reactive components and adequate impregnation of the fibrous reinforcing material. The impregnation die may preferably be fitted with a mixing apparatus, such as a static mixer, which provides for mixing of the reactive components before the resulting reaction mixture is used to impregnate the fibrous reinforcing structure. Other types of mixing devices are known to those skilled in the art and may optionally be used in the practice of the present invention. Examples of such other mixing devices include, but are not limited to, high-pressure impingement mixing devices and low pressure dynamic mixers such as rotating paddles. In some cases, adequate mixing may be provided in the impregnation die itself, without any additional mixing apparatus.

The pultrusion apparatus preferably has at least one impregnation die and at least one curing die. Because it is preferred that no polymerization takes place in the impregnation die, the curing die will usually be operated at a temperature higher than that of the impregnation die. The pultrusion apparatus may optionally contain a plurality of curing dies, or zones. Different curing zones may be set at different temperatures, if desired, but all the zones of the curing die will generally be higher in temperature than the impregnation die. The pultrusion apparatus may optionally contain a plurality of impregnation dies. Preferably, there is just one impregnation die, and this preferably is situated immediately prior to the first curing die (or zone). As mentioned hereinabove, the impregnation die is generally set at a temperature that provides for substantially no reaction (polymerization) between the polyisocyanate component and the polyisocyanate-reactive component in the polyurethane-forming formulation before the fibrous reinforcing structure, which has been at least partially impregnated with the polyurethane-forming formulation, enters the first curing die (or zone).

Any coating or protective material may be applied to the fiber reinforced composites produced in accordance with the present invention. Examples of suitable coating materials include: paints, films, Cerama-Star 2K coating from Akzo Nobel, DuraBright from Akron Paint & Varnish, Red Spot Paint & Varnish 2K coatings.

EXAMPLES

The present invention is further illustrated, but is not to be limited, by the following examples. All quantities given in "parts" and "percents" are understood to be by weight, unless otherwise indicated.

The following materials were used in the formulations described in the Examples which follow:

M9111 a propylene glycol-initiated propoxylated/ethoxylated diol having a hydroxyl number of about 28 meq/g KOH which is commercially available under the name Multranol 9111 from Bayer MaterialScience LLC;

E-824 a propoxylated/ethoxylated glycerol, nominal triol having a hydroxyl number of about 35 meq/g KOH which is commercially available under the name Arcol Hyperlite E 824 from Bayer MaterialScience LLC;

M3901 a propoxylated/ethoxylated glycerol having a nominal functionality of 3 and a hydroxyl number of about 28 meq/g KOH which is commercially available under the name Multranol 3901 from Bayer MaterialScience LLC;

PPG2000 an oxypropoxylated propylene glycol, nominal diol having a hydroxyl number of about 56 meq/g KOH which is commercially available under the name PPG 2000 from Bayer MaterialScience LLC;

Agrol 2.0 an oxypropoxylated soy oil having a nominal functionality of 2 and a hydroxyl number of about 70 meq/g KOH which is commercially available under the name Agrol 2.0 from BioBased Systems;

XFN 50 a cashew oil polyol having a nominal functionality of 4 and a hydroxyl number of about 180 meq/g KOH which is commercially available under the name Polycard XFN 50 from Composite Technical Services;

XFN 100 a cashew oil polyol having a nominal functionality of 2 and a hydroxyl of 320-340 meq/gKOH which is commercially available under the name of Polycard XFN 100 from Composite Technical Services;

XFN 150 A cashew oil polyol having a nominal functionality of 3 and hydroxyl number of 500-540 based on a Mannich base and commercially available under the name of Polycard XFN 150 from Composite Technical Services TPG: tripropylene glycol;

LHT240: a propoxylated glycerin having a nominal functionality of 3 and a hydroxyl number of 240 meq/g KOH which is commercially available under the name LHT 240 from Bayer MaterialScience LLC;

E9133: a propoxylated glycerin having a nominal functionality of 3 and a hydroxyl number of 1058 meq/g KOH which is commercially available under the name Multranol 9133 from Bayer MaterialScience LLC;

E9158: a propoxylated glycerin having a nominal functionality of 3 and a hydroxyl number of 470 meq/g KOH which is commercially available under the name Multranol 9158 from Bayer MaterialScience LLC;

PPG4000: a propoxylated propylene glycol having a nominal functionality of 2 and a hydroxyl number of 28 meq/g KOH which is commercially available under the name PPG 4000 from Bayer MaterialScience LLC;

Castor Oil: Castor Oil commercially available under the name SD Castor Oil from Acme Hardesty.

Baylith: a drying paste which is commercially available under the name Baylith Blend from Bayer MaterialScience LLC;

UL29: a tin catalyst which is commercially available under the name available as FORMREZ UL 29 from Momentive Plastics;

INT1498: an internal release agent which is commercially available under the name Axel INT 1498 from Axel Plastics; and ISO: polymeric diphenylmethane diisocyanate (pMDI) having an NCO content of 31.5% by weight; a viscosity of 200 mPa·s @ 25° C.; and a functionality of 2.8 which is commercially available under the name Mondur MR from Bayer MaterialScience LLC.

Examples 1-24

Polyol Blends composed of the materials listed in Tables 1 and 2 in the amounts listed in Table 1 or Table 2 were prepared. Each of these blends was then combined with ISO in the amount indicated in Table 1 or Table 2 to form the polyurethane pultrusion formulation Each of the pultrusion formulations was processed in accordance with the general procedure described below using the same equipment and process conditions for each formulation.

The general pultrusion procedure used in each of Examples 1-24 was as follows:

The polyisocyanate and isocyanate-reactive components listed in Table 1 or Table 2 were fed to a mix/metering machine in the amounts specified in Table 1 or Table 2. The resultant reaction mixture was supplied to an injection/wet out box maintained at a temperature of 15-23° C. Glass fibers were impregnated with the reaction mixture as the glass fibers were pulled into the injection die. The wetted glass fibers were then pulled from the injection box through a zoned heating die that was attached directly to the injection die. The zoned heating die had a cross section shaped as a flat plank. The wetted fibers were then shaped and cured in the zoned heating die. The zoned heating die had 3 heated zones equipped with electrical heating coils individually controlled to maintain the temperature at 125° C. in the first zone past the injection die, 200° C. in the second zone past the injection die, and 190° C. in the third zone past the injection die. The entrance to the injection die was cooled to prevent premature polymerization. The dynamic force needed to pull the composite through the forming die was supplied by a pulling machine with gripping devices that contacted the cured composite profile (or the glass fibers therein) and gave the traction necessary to pull the composite profile through the die. The pulling machine also had a device that developed a force in the desired direction of pull that gave the impetus necessary to pull the composite profile continuously through the die. The composite profile exiting the pulling machine was then cut to the desired length by an abrasive cut off saw. The amount of glass in the composite part thus produced was 80%, by weight, based on total weight of the composite with the balance being polyurethane resin.

Samples of the polyurethane reinforced composites thus produced were wiped with isopropyl alcohol and allowed to dry for several minutes. A white coating was then sprayed onto the composite surface and the sprayed samples were then placed in a convection oven heated to 105° C. for seven minutes. The painted samples were then allowed to cool for two hours before being tested for adhesion. The cross hatch adhesion test was performed using a fine bladed (OFLA) cutter and Scotch tape (ASTM 3359). After 24 hours, adhesion was tested a second time. The nickel scratch test (ASTM D2197) was performed on all samples after 24 hours. Accu Dyne pens were used to measure the surface energy of the unpainted substrate. The results obtained for these coated samples are reported in the Tables which follow.

|  | Ex. | | | | | | | | | | | | | |
| --- | --- | --- | --- | --- | --- | --- | --- | --- | --- | --- | --- | --- | --- | --- |
|  | 1* | 2 | 3 | 4 | 5 | 6* | 7* | 8* | 9* | 10* | 11* | 12* | 13* | 14* |
| M9111 | — | — | — | — | — | — | — | — | — | — | — | — | — | 18.07 |
| E-824 | — | — | — | — | — | — | — | — | — | — | — | 18.07 | — | — |
| M3901 | — | — | — | — | — | — | — | — | — | — | — | — | 18.07 | — |
| PPG2000 | — | — | — | — | — | — | — | — | — | — | 18.07 | — | — | — |
| Agrol 2.0 | — | — | — | — | — | — | — | — | 18.07 | 18.07 | — | — | — | — |
| XFN50 | — | 18.07 | 22.59 | 18.07 | 27.10 | — | — | — | — | — | — | — | — | — |
| TPG | — | — | — | — | — | 18.07 | 22.58 | 18.07 | — | — | — | — | — | — |
| LHT240 | 27.10 | 27.10 | 13.55 | 27.10 | — | 27.10 | 27.10 | 27.10 | 27.10 | 27.10 | 27.10 | 27.10 | 27.10 | 27.10 |
| E9133 | 22.58 | 22.58 | 22.58 | 22.58 | 22.58 | 22.58 | 22.58 | 22.58 | 22.58 | 22.58 | 22.58 | 22.58 | 22.58 | 22.58 |
| E9158 | 22.58 | 22.58 | 22.58 | 22.58 | 22.58 | 22.58 | 22.58 | — | 22.58 | 22.58 | 22.58 | 22.58 | 22.58 | 22.58 |
| PPG4000 | 18.07 | — | 9.04 | — | 18.07 | — | 18.07 | — | — | — | — | — | — | — |
| Baylith | 3.61 | 3.61 | 3.61 | 3.61 | 3.61 | 3.61 | 3.61 | 3.61 | 3.61 | 3.61 | 3.61 | 3.61 | 3.61 | 3.61 |
| UL29 | 0.63 | 0.63 | 0.63 | 0.63 | 0.63 | 0.63 | 0.63 | 0.63 | 0.63 | 0.63 | 0.63 | 0.63 | 0.63 | 0.63 |
| INT1498 | 5.43 | 5.43 | 5.43 | 5.43 | 5.43 | 5.43 | 5.43 | 5.43 | 5.43 | 5.43 | 5.43 | 5.43 | 5.43 | 5.43 |
| ISO | 100 | 115 | 100 | 120 | 100 | 115 | 100 | 120 | 100 | 100 | 100 | 100 | 100 | 100 |
| Surface Energy (dynes) | 36 | 34 | 34 | 34 | 34 | 34 | 34 | 34 | 34 | 36 | 34 | 34 | 34 | 34 |
| % Adhesion, initial | 0 | 100 | 80 | 100 | 100 | 0 | 0 | 0 | 75 | 90 | 30 | 15 | 50 | 0 |
| % Adhesion, 24 hrs. | 5 | 100 | 100 | 100 | 100 | 0 | 5 | 0 | 95 | 100 | 95 | 75 | 95 | 25 |
| Ni Scratch | Fail | Marginal | Pass | Pass | Pass | Fail | Fail | Fail | Marginal | Pass | Fail | Fail | Marginal | Fail |
| Feathering |  | None | Severe edge | slight edge | none |  |  |  |  | Slight edge |  |  |  |  |
| Complete sheet off | Yes | No | No | No | No | Yes | Yes | Yes |  |  |  |  |  | Yes |

*Comparative

TABLE 2

|  | Example | | | | | | | | | |
| --- | --- | --- | --- | --- | --- | --- | --- | --- | --- | --- |
|  | 15* | 16* | 17* | 18 | 19 | 20 | 21* | 22* | 23 | 24 |
| LHT 240 | 27.3 | 27.3 | 27.3 | 9.1 | 18.23 | 9.1 | 22.8 | 18.23 | 13.7 | 9.1 |
| E9133 | 22.83 | 22.83 | 22.83 | 22.83 | 22.83 | 22.83 | 22.83 | 22.83 | 22.83 | 22.83 |
| E9158 | 22.84 | 22.84 | 22.84 | 22.84 | 22.84 | 22.84 | 22.84 | 22.84 | 22.84 | 22.84 |
| PPG 4000 | 18.23 |  |  |  |  |  | 18.23 | 18.23 | 18.23 | 18.23 |
| Castor Oil |  |  | 18.23 |  |  |  |  |  |  |  |
| E824 |  | 18.23 |  | 18.23 | 18.23 |  |  |  |  |  |
| XFN 50 |  |  |  | 18.23 |  | 18.23 | 4.55 | 9.1 | 13.7 | 18.23 |
| XFN100 |  |  |  |  | 9.1 |  |  |  |  |  |
| XFN150 |  |  |  |  |  | 0.91 |  |  |  |  |
| Baylith | 3.6 | 3.6 | 3.6 | 3.6 | 3.6 | 3.6 | 3.6 | 3.6 | 3.6 | 3.6 |
| UL 29 | 0.64 | 0.64 | 0.64 | 0.64 | 0.64 | 0.64 | 0.64 | 0.64 | 0.64 | 0.64 |
| INT 1498 | 4.56 | 4.56 | 4.56 | 4.56 | 4.56 | 4.56 | 4.56 | 4.56 | 4.56 | 4.56 |
| ISO | 104 | 115 | 104 | 105 | 110 | 105 | 108 | 106 | 106 | 105 |
| % Cross Hatch Adhesion @ 24 hrs. | 0 | 100 | >20 | 100 | 100 | 100 | >20 | >20 | >90 | 100 |

*Comparative Example

Painted Composite Test Results—Adhesion

Each of the composites described in Table 1 was subsequently tested in accordance with AAMA 625 for paint adhesion with three different types of paint using one of two different application techniques. The results of these tests are reported in Tables 3 (Bronze APV coating; draw down 5 mil gap and baked at 95° C. for 30 minutes), 4 (Gray semi gloss; spray application <2 mil dft; baked at 80° C. for 30 minutes), and 5 (Gray satin; draw down 5 mil gap; baked at 95° C. for 20 minutes).

TABLE 3

| | Bronze APV coating | | | |
| --- | --- | --- | --- | --- |
| Composite of Example: | Composite (0-100) | Dry Adhesion (%) | Wet Adhesion (%) | Boiling Water (%) |
| 1* | 3 | 0 | 0 | 10 |
| 2 | 100 | 100 | 100 | 100 |
| 3 | 98 | 100 | 100 | 95 |
| 4 | 100 | 100 | 100 | 100 |
| 5 | 59 | 89 | 42 | 46 |
| 6* | 42 | 24 | 3 | 100 |
| 7* | 3 | 5 | 2 | 1 |

TABLE 3-continued

Bronze APV coating

| Composite of Example: | Composite (0-100) | Dry Adhesion (%) | Wet Adhesion (%) | Boiling Water (%) |
|---|---|---|---|---|
| 8* | 2 | 0 | 4 | 1 |
| 9* | 35 | 94 | 7 | 3 |
| 10* | 42 | 83 | 9 | 33 |
| 12* | 44 | 32 | 100 | 0 |
| 13* | 0 | 0 | 0 | 0 |
| 14* | 40 | 31 | 89 | 0 |

*Comparative

TABLE 4

Gray semi-gloss

| Composite of Example: | Composite (0-100) | Dry Adhesion (%) | Wet Adhesion (%) | Boiling Water (%) |
|---|---|---|---|---|
| 1* | 34 | 2 | 100 | 1 |
| 2 | 100 | 100 | 100 | 100 |
| 3 | 100 | 99 | 100 | 100 |
| 4 | 100 | 99 | 100 | 100 |
| 5 | 100 | 99 | 100 | 100 |
| 6* | 85 | 62 | 98 | 94 |
| 7* | 92 | 82 | 93 | 100 |
| 8* | 4 | 0 | 11 | 0 |
| 9* | 97 | 92 | 100 | 100 |
| 10* | 84 | 69 | 91 | 91 |
| 12* | 35 | 0 | 94 | 10 |
| 13* | 87 | 100 | 99 | 62 |
| 14* | 32 | 0 | 96 | 0 |

*Comparative

TABLE 5

Gray satin

| Composite of Example: | Composite (0-100) | Dry Adhesion (%) | Wet Adhesion (%) | Boiling Water (%) |
|---|---|---|---|---|
| 1* | 18 | 0 | 54 | 1 |
| 2 | 100 | 100 | 100 | 100 |
| 3 | 100 | 99 | 100 | 100 |
| 4 | 39 | 0 | 18 | 100 |
| 5 | 63 | 26 | 100 | 64 |
| 6* | 38 | 1.5 | 98 | 15 |
| 7* | 37 | 0 | 100 | 11 |
| 8* | 33 | 0 | 100 | 0 |
| 9* | 58 | 20 | 100 | 54 |
| 10* | 79 | 38 | 100 | 98 |
| 12* | 26 | 0 | 78 | 0 |
| 13* | 99 | 97 | 100 | 99 |
| 14* | 30 | 0 | 89 | 0 |

*Comparative

The data reported in Tables 3, 4 and 5 was generated using a different kind of paint for the samples described in each of those Tables. Each composite produced with control formula #1 had essentially no adhesion for any of the three different kinds of paint tested. However, composites produced with formulae within the scope of the present invention did exhibit at least some degree of adhesion with respect to each of the three different type of paint.

It is clear from the results reported in the Tables above that the formulations that included a cashew oil based polyol performed best with respect to paint adhesion with all types of coatings from solvent based to water based coatings. The improved adhesion may be attributable to the fact that cashew oil is an aromatic based oil which differs from the typical aliphatic oils such as soy and or castor oil.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A polyurethane-forming system suitable for the production of a fiber reinforced composite to which a coating may be applied with minimal pretreatment comprising:
    a) a polyisocyanate component comprising at least one polyisocyanate, and
    b) an isocyanate-reactive component comprising 20% to 30% by weight, based on total weight of the isocyanate-reactive component, of at least one cashew oil-based polyether polyol wherein the cashew oil-based polyol has a hydroxyl number of from 175 to 550 and a functionality of from 2 to 5.

2. The system of claim 1 in which the isocyanate-reactive component includes up to 40% by weight of a polyol having a number average molecular weight of at least 1500 Da.

3. The system of claim 1 in which the isocyanate-reactive component includes up to 40% by weight of a polyol having a number average molecular weight of less than 1500 Da.

4. The system of claim 1 in which the at least one cashew oil-based polyether polyol has a viscosity less than 4000 cps.

5. The system of claim 1 in which the isocyanate-reactive component has a hydroxyl number of between 400 and 420.

6. The system of claim 1 in which the isocyanate component and the isocyanate-reactive component are combined in amounts such that the isocyanate index is 70 to 150%.

7. The system of claim 1, wherein the system further comprises an internal mold release agent.

8. A pultrusion process for preparing a fiber reinforced polyurethane composite with improved paint adhesion, the process comprising:
    a) continuously pulling a roving or tow of continuous fiber reinforcing material successively through an impregnation chamber and a die;
    b) continuously feeding a polyurethane-forming system comprising a polyisocyanate component comprising at least one polyisocyanate, and an isocyanate-reactive component comprising at least one cashew oil-based polyether polyol to the impregnation chamber, wherein the at least one cashew oil-based polyether polyol is present in an amount of 20% to 30% by weight, based on total weight of the isocyanate-reactive component, has a hydroxyl number of from 175 to 550 and a functionality of from 2 to 5;
    c) contacting the fiber reinforcing material with the polyurethane-forming system in the impregnation chamber in a manner such that substantially complete wetting of the fiber reinforcing material by the polyurethane-forming system occurs;
    d) directing the fiber reinforcing material from c) through a die heated to reaction temperature to form a solid composite; and
    e) drawing the composite from the die.

9. The pultrusion process of claim 8 in which the fiber reinforcing material is selected from the group consisting of single strands, braided strands, woven mat structures, non-woven mat structures and combinations thereof.

10. The pultrusion process of claim 8 in which the fiber reinforcing material comprises one or more of glass fibers, glass mats, carbon fibers, polyester fibers, natural fibers, aramid fibers, basalt fibers and nylon fibers.

11. The pultrusion process of claim 8 in which the at least one cashew oil-based polyether polyol has a viscosity of less than 2000 cps.

12. The pultrusion process of claim 8 in which the isocyanate-reactive component has a hydroxyl number of from about 100 to about 1,000.

13. The pultrusion process of claim 8, wherein the polyurethane-forming system further comprises an internal mold release agent.

14. A composite produced by the process of claim 8.

15. A painted composite produced by applying paint to the composite of claim 14.

16. A polyurethane composite comprising:
   a) 30 to 95% by weight, based on the weight of the composite, of a fiber reinforcing material; and
   b) a polyurethane that is a reaction product of a reaction mixture comprising:
      i) a polyisocyanate component comprising at least one polyisocyanate, and
      ii) an isocyanate-reactive component comprising 20% to 30% by weight, based on total weight of the isocyanate-reactive component, of at least one cashew oil-based polyether polyol, wherein the cashew oil-based polyol has a hydroxyl number of from 175 to 550 and a functionality of from 2 to 5.

17. The composite of claim 16, further comprising an internal mold release agent.

* * * * *